United States Patent
Mori et al.

(10) Patent No.: US 7,671,724 B2
(45) Date of Patent: Mar. 2, 2010

(54) VEHICLE ANTI-THEFT APPARATUS AND METHOD

(75) Inventors: Kazunori Mori, Hyogo (JP); Ryousaku Obo, Hyogo (JP); Kenji Yamanaka, Hyogo (JP); Hiroshi Sakaguchi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 727 days.

(21) Appl. No.: 11/500,286

(22) Filed: Aug. 8, 2006

(65) Prior Publication Data

US 2007/0236329 A1  Oct. 11, 2007

(30) Foreign Application Priority Data

Mar. 29, 2006 (JP) ............................. 2006-091398

(51) Int. Cl.
*G08B 19/00* (2006.01)
*B60R 25/04* (2006.01)

(52) U.S. Cl. ................ 340/426.36; 340/5.28; 340/5.42; 340/5.61; 340/5.65; 340/5.72; 307/10.5

(58) Field of Classification Search ............ 340/426.36, 340/5.28, 5.42
See application file for complete search history.

(56) References Cited

U.S. PATENT DOCUMENTS

| | | | |
|---|---|---|---|
| 6,388,558 B1* | 5/2002 | Emmei | 340/5.2 |
| 7,170,390 B2* | 1/2007 | Quinones et al. | 340/5.3 |
| 2002/0024418 A1* | 2/2002 | Ayala et al. | 340/5.26 |

FOREIGN PATENT DOCUMENTS

| | | |
|---|---|---|
| JP | 6-74537 U | 10/1994 |
| JP | 09-048323 A | 2/1997 |
| JP | 2002-13326 A | 1/2002 |
| JP | 2005-081995 A | 3/2005 |

* cited by examiner

*Primary Examiner*—Donnie L Crosland
(74) *Attorney, Agent, or Firm*—Sughrue Mion, PLLC

(57) ABSTRACT

A vehicle anti-theft apparatus and method can prevent the theft of a vehicle and the illegal use thereof without increased costs. The apparatus includes an IC card carried by a user of a vehicle, an IC card reader in the vehicle for reading information contained in the IC card, and an authentication processing section in the vehicle for authenticating the user when the vehicle is used. The IC card includes a memory for storing identification information and use time limit information of the vehicle. The IC card reader reads the identification information and the use time limit information stored in the memory. When the identification information of the IC card and authentication identification information stored beforehand in the vehicle coincide with each other, and when a current time is within a use time limit of the use time limit information, the authentication processing section permits the use of the vehicle.

5 Claims, 4 Drawing Sheets

VEHICLE ANTI-THEFT APPARATUS AND METHOD

BACKGROUND OF THE INVENTION

1. Field of the Invention

The present invention relates to a vehicle anti-theft apparatus and method in which an IC card is used for preventing the theft of a vehicle.

2. Description of the Related Art

There has hitherto been known a vehicle anti-theft apparatus including a portable transmitter, a receiver, and an engine control section. The portable transmitter has a memory that stores an individual identification ID, a CPU that converts the individual identification ID in the memory into a data signal which can be radio transmitted, and a transmitter part that transmits the data signal from the CPU through radio communications. The receiver has a receiver part that receives the data signal from the portable transmitter, and a CPU that compares the individual identification ID of the data signal thus received with the individual collation identification ID stored in the memory, and outputs only a coincidence signal to the engine control section. The engine control section has a CPU that manages engine operating environments and performs the management of a vehicle security mechanism.

When the data signal is sent from the portable transmitter to the receiver, the receiver makes a comparison between a transmitter side ID and a receiver side ID, and outputs only a coincidence signal to the engine control section thereby to make the engine into a start standby state (see, for example, a first patent document: Japanese utility model application laid-open No. H06-74537).

Also, there has hitherto been known a rental car system which includes at least one keyless remote controller transmitter to which individual ID information is given and which sends a predetermined unlock signal containing at least ID information in accordance with an unlock operation, at least one vehicle having a keyless remote controller receiver which collates, upon reception of the predetermined unlock signal containing ID information, the ID information contained in the unlock signal to the use permission ID information that has been beforehand registered and set by a vehicle management center through a radio communication section, and unlocks door lock if the result of the collation is a match or coincidence, and the vehicle management center that sends the ID information of a keyless remote controller transmitter held by a reserved or booked user to the keyless remote controller receiver of the vehicle to be lent through the radio communication section (see, for instance, a second patent document: Japanese patent application laid-open No. 2002-13326).

In the conventional vehicle anti-theft apparatus as described in the first patent document, there is a problem that it is necessary to provide the special portable transmitter capable of communicating with the receiver, thus resulting in an increased cost.

In addition, in the conventional rental car system as described in the second patent document, there is a problem that should the ID information of the keyless remote controller transmitter be deciphered and the vehicle be stolen, the theft vehicle might be illegally used. Further, there is also another problem that when the ID information of the keyless remote controller transmitter is registered in the keyless remote controller receiver, it is necessary to provide the vehicle management center, thereby increasing the cost of the system.

SUMMARY OF THE INVENTION

Accordingly, the present invention is intended to obviate the above-mentioned problems, and has for its object to provide a vehicle anti-theft apparatus and method which are capable of preventing the theft of the vehicle without increasing the cost as well as the illegal use of the theft vehicle.

Bearing the above object in mind, according to the present invention, there is provided a vehicle anti-theft apparatus which includes an IC card that is carried by a user of a vehicle; an IC card reader that is provided in the vehicle for reading information in the IC card; and an authentication processing section that is provided in the vehicle for authenticating the user when the vehicle is used by the user. The IC card includes a storage section that stores identification information of the vehicle and use time limit information of the vehicle. The IC card reader includes a reading section that reads the identification information and the use time limit information stored in the storage section. When the identification information and authentication identification information that is stored beforehand in the vehicle coincide with each other, and when a current time is within a use time limit of the use time limit information, the authentication processing section permits the use of the vehicle.

According to the vehicle anti-theft apparatus of the present invention, when it is determined, based on the identification information and the use time limit information of a vehicle stored in the IC card, that the identification information of the IC card and the authentication identification information stored beforehand in the vehicle coincide with each other, and when the current time is within the use time limit of the use time limit information, the authentication processing section installed on the vehicle permits the use of the vehicle.

Accordingly, it is possible to prevent the theft of the vehicle without increasing the cost, and hence the illegal use of the theft vehicle as well.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Figure 1:
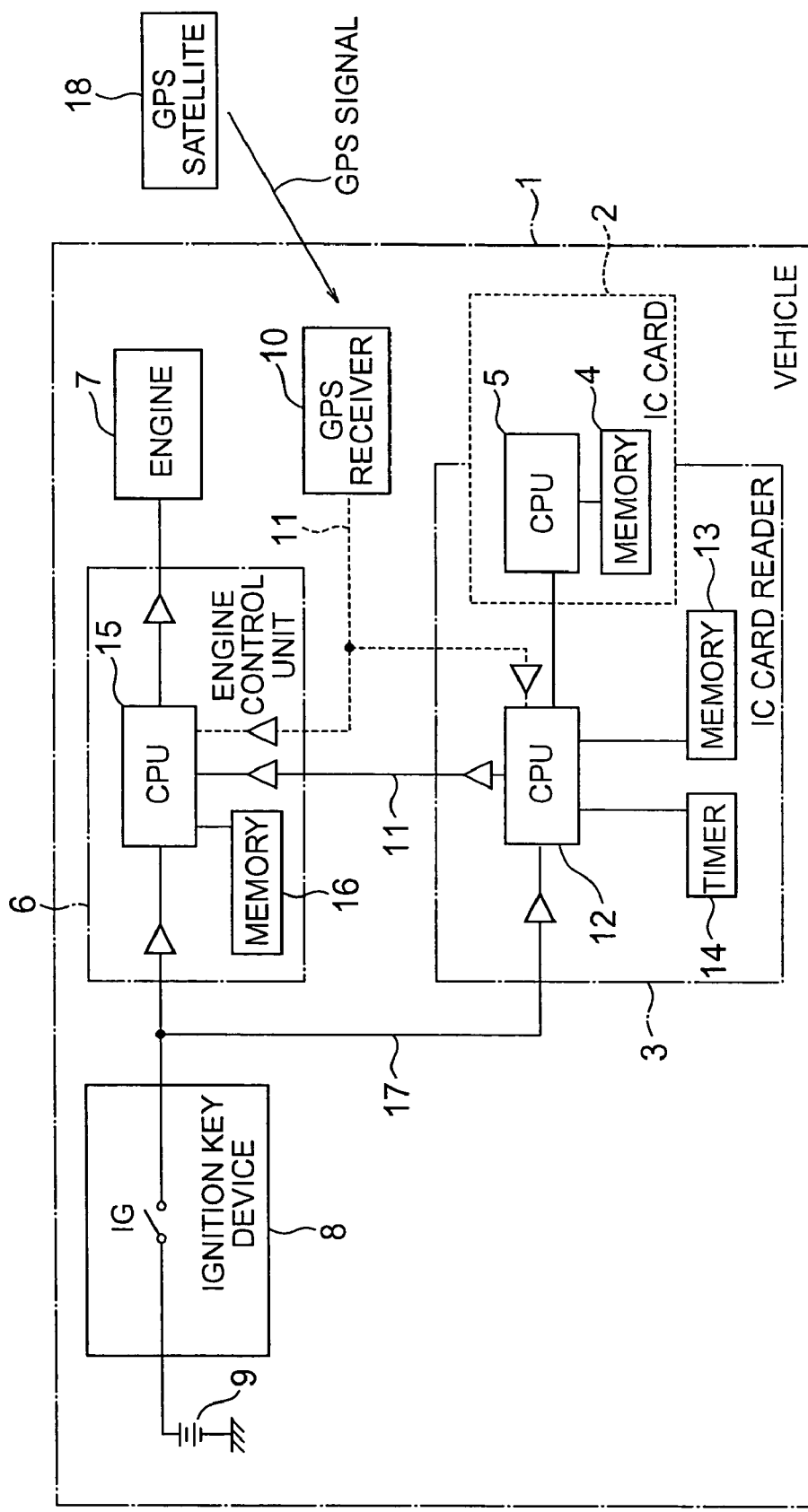
FIG. 1 is a block diagram showing an anti-theft system for a vehicle anti-theft apparatus according to a first embodiment of the present invention.

Now, a preferred embodiment of the present invention will be described in detail while referring to the accompanying drawings. Throughout respective figures, the same or corresponding members or parts are identified by the same reference numerals and characters.

Embodiment 1

FIG. 1 is a block diagram that shows an anti-theft system of a vehicle anti-theft apparatus according to a first embodiment of the present invention.

In FIG. 1, the anti-theft system includes an IC card 2 that is carried by a user of a vehicle 1, and the vehicle 1 that has an IC card reader 3 for reading information contained in the IC card 2 and an authentication processing section (not shown) which authenticates a user when the user uses the vehicle 1.

Here, it is assumed that the vehicle 1 is a rental car, for example.

The IC card 2 includes a memory 4 (storage section) and a CPU 5, and the vehicle 1 includes the IC card reader 3, an engine control unit 6, an engine 7, an ignition key device 8, and a battery 9.

Here, note that a GPS receiver (GPS (Global Positioning System) device) 10 is provided as required.

Also, the IC card 2 may be either a general contact type one or a contactless type one, and need not be a dedicated special IC card.

The engine control unit 6 is connected to the IC card reader 3 through a communication line 11, and the GPS receiver 10 is connected to at least either one of the IC card reader 3 and the engine control unit 6 through a similar communication line 11.

Here, note that arbitrary communication lines such as CAN (Controller Area Network) communication lines used for in-vehicle LAN communication, ISO 14230 communication lines, dedicated serial communication line, etc., are used as the communication lines 11.

The memory 4 stores identification information for identifying the individual vehicle 1, and use time limit information that indicates the use time limit or expiration date and time of the vehicle 1. The identification information and the use time limit information are encrypted and rewritable.

The CPU 5 takes out identification information and use time limit information from the memory 4 in accordance with the reading by the IC card reader 3, and outputs them to the IC card reader 3. Also, in accordance with a write signal (to be described later) from an IC card writing device 19 (to be described later), the CPU 5 stores the use time limit information contained in the write signal into the memory 4.

The IC card reader 3 includes a CPU 12 that executes calculation processing, a memory 13 that stores programs and data, and a timer device 14 that outputs the current time (i.e., including the current year, month, day, hour, minute and second).

The CPU 12 in the IC card reader 3 constitutes a reading section (step S42 to be described later) that reads the identification information and the use time limit information stored in the memory 4, and a use time limit information determination section (step S43 to be described later) that determines whether the current time output from the timer device 14 is within the use time limit of the use time limit information.

The engine control unit 6 includes a CPU 15 that executes calculation processing, and a memory 16 that stores programs and data, and controls the starting and stopping of the engine 7.

Here, note that specific or inherent authentication identification information, which varies according to the individual vehicle 1, is stored beforehand in the memory 16.

Also, the CPU 15 in the engine control unit 6 constitutes an identification information determination section (step S54 to be described later) that determines whether identification information stored in the memory 4 coincides with the authentication identification information.

The ignition key device 8 is connected to the battery 9, and detects a request for starting the engine 7 (hereinafter also referred to as an engine start request). In addition, the ignition key device 8 transmits the engine start request to the IC card reader 3 and the engine control unit 6 through an ignition signal line 17.

The GPS receiver receives a GPS signal sent from a GPS satellite 18, and acquires the current time (including the year, month, day, hour, minute and second of the current time) contained in the GPS signal, and the GPS receiver 10 outputs the current time thus acquired to at least either one of the IC card reader 3 and the engine control unit 6.

Here, note that the use time limit information determination section of the IC card reader 3 and the identification information determination section of the engine control unit 6 together constitute an authentication processing section that serves to authenticate a user when the user uses the vehicle 1.

When the identification information stored in the memory 4 of the IC card 2 and the authentication identification information stored in the memory 16 of the engine control unit 6 coincide with each other, and when the current time output from the timer device 14 of the IC card reader 3 is within the use time limit of the use time limit information stored in the memory 4, the authentication processing section permits the use of the vehicle 1.

In addition, the authentication processing section authenticates the user of the vehicle 1 when the user tries to start the engine 7.

First of all, when an engine start request is detected by the ignition key device 8, the use time limit information determination section of the IC card reader 3 determines whether the current time is within the use time limit of the use time limit information, and when it is within the use time limit, the use time limit information determination section sends the identification information to the engine control unit 6.

Here, note that the identification information sent to the engine control unit 6 is transmitted as an encrypted serial communication signal.

Subsequently, when the engine start request is detected by the ignition key device 8, and when the identification information is received from the IC card reader 3, the identification information determination section of the engine control unit 6 determines whether the identification information thus received coincides with the authentication identification information, and puts the engine 7 into an engine start permission state when there is coincidence therebetween.

Here, note that the identification information and the use time limit information of the vehicle 1 are stored beforehand in the memory 4 of the IC card 2 by the rental car provider before the user carries the IC card 2.

Hereinafter, reference will be made to the operation of writing identification information and use time limit information into the IC card 2 by the rental car provider while referring to FIGS. 2 and 3 together with FIG. 1.

Figure 2:
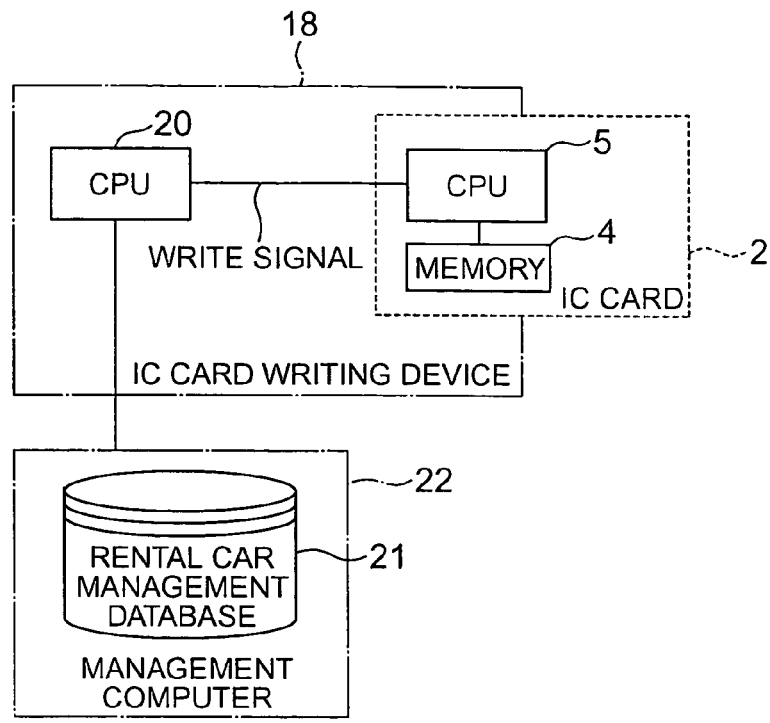
FIG. 2 is a block diagram showing an IC card writing device according to the first embodiment of the present invention.

FIG. 2 is a block diagram that shows the IC card writing device 19 according to the first embodiment of the present invention.

In FIG. 2, the IC card writing device 19 includes a CPU 20, and an IC card 2 is set in the IC card writing device 19. The CPU 20 is connected to a management computer 22 that has a rental car management database 21. The rental car management database 21 includes the identification information and the use time limit information of the vehicle 1 possessed by the rental car provider. The CPU 20 takes out the identification information and the use time limit information from the rental car management database 21, and sends to the IC card 2 a write signal that includes the identification information and use time limit information thus taken out.

Next, reference will be made to the operation of the rental car provider issuing the IC card 2 of the vehicle 1 while referring to a flow chart of FIG. 3.

First of all, the rental car provider determines whether there is the acceptance of renting the vehicle 1 (step S31), and when it is determined in step S31 that there is the acceptance of renting (that is, Yes), identification information and use time limit information is written into the IC card 2 of the vehicle 1 for rental by using the IC card writing device 19, as previously stated (step S32).

Figure 3:
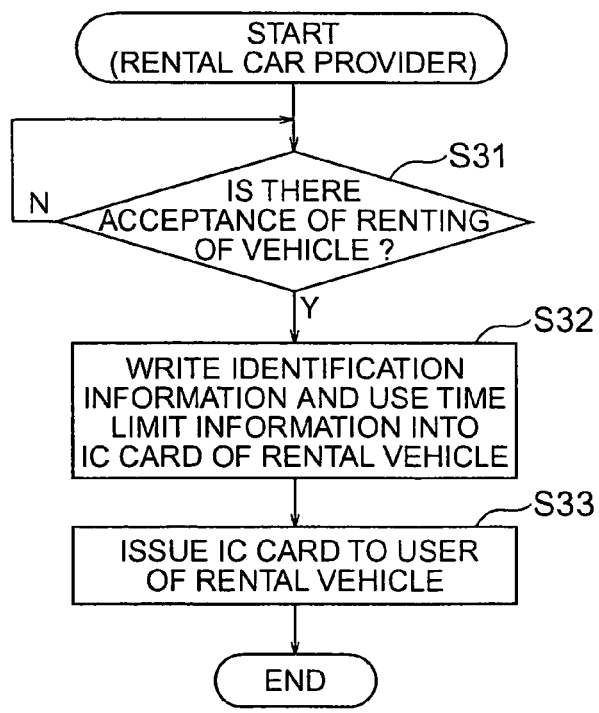
FIG. 3 is a flow chart illustrating a vehicle IC card issuing operation of a rental car provider according to the first embodiment of the present invention.

Subsequently, the IC card 2 is issued to the user of the rental vehicle 1 (step S33), and the flow chart of FIG. 3 is terminated.

On the other hand, when it is determined in step S31 that there is no acceptance of renting (that is, No), a return is performed to step S31 where it is determined again whether there is the acceptance of renting the vehicle 1.

Now, reference will be made to the operation of the IC card reader 3 of the vehicle anti-theft apparatus according to the first embodiment of the present invention while referring to a flow chart of FIG. 4 together with FIG. 1.

First, it is determined whether an engine start request has been detected by the ignition key device 8 (step S41), and when it is determined in step S41 that an engine start request has been detected (that is, Yes), identification information and use time limit information is taken out from the IC card 2 (step S42).

On the other hand, when it is determined in step S41 that an engine start request has not been detected (that is, No), a return is performed to step S41 where it is determined again whether an engine start request has been detected.

Figure 4:
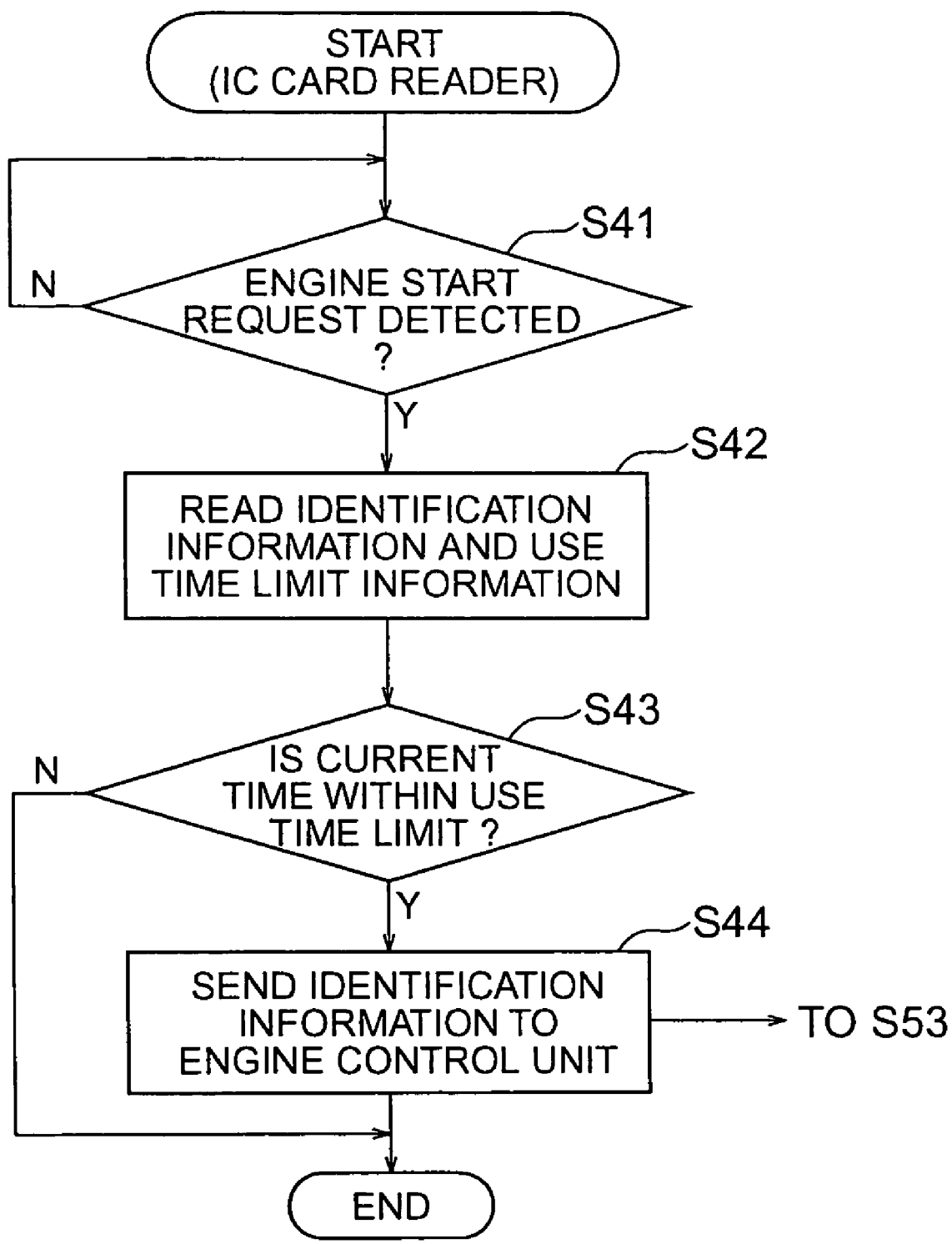
FIG. 4 is a flow chart illustrating the operation of an IC card reader of the vehicle anti-theft apparatus according to the first embodiment of the present invention.

Subsequently, it is determined whether the current time is within the use time limit of the use time limit information (step S43), and when it is determined in step S43 that the current time is within the use time limit (that is, Yes), identification information is sent to the engine control unit 6 (step S44), and the processing routine of FIG. 4 is terminated.

On the other hand, when it is determined in step S43 that the current time is not within the use time limit (that is, No), the processing of FIG. 4 is terminated at once.

Now, reference will be made to the operation of the engine control unit 6 the IC card reader 3 of the vehicle anti-theft apparatus according to the first embodiment of the present invention while referring to a flow chart of FIG. 5 together with FIGS. 1 and 4.

First, it is determined whether an engine start request has been detected by the ignition key device 8 (step S51), and when it is determined in step S51 that an engine start request has been detected (that is, Yes), authentication identification information is taken out from the memory 16 (step S52), whereas when it is determined in step S51 that an engine start request has not been detected (that is, No), a return is performed to step S51 where it is determined again whether an engine start request has been detected.

Subsequently, it is determined whether identification information has been received from the IC card reader 3 (i.e., whether identification information has been output in step S44 shown in FIG. 4) (step S53), and when it is determined in step S53 that identification information has been received from the IC card reader 3 (that is, Yes), it is further determined whether the identification information thus received coincides with the authentication identification information (step S54).

Figure 5:
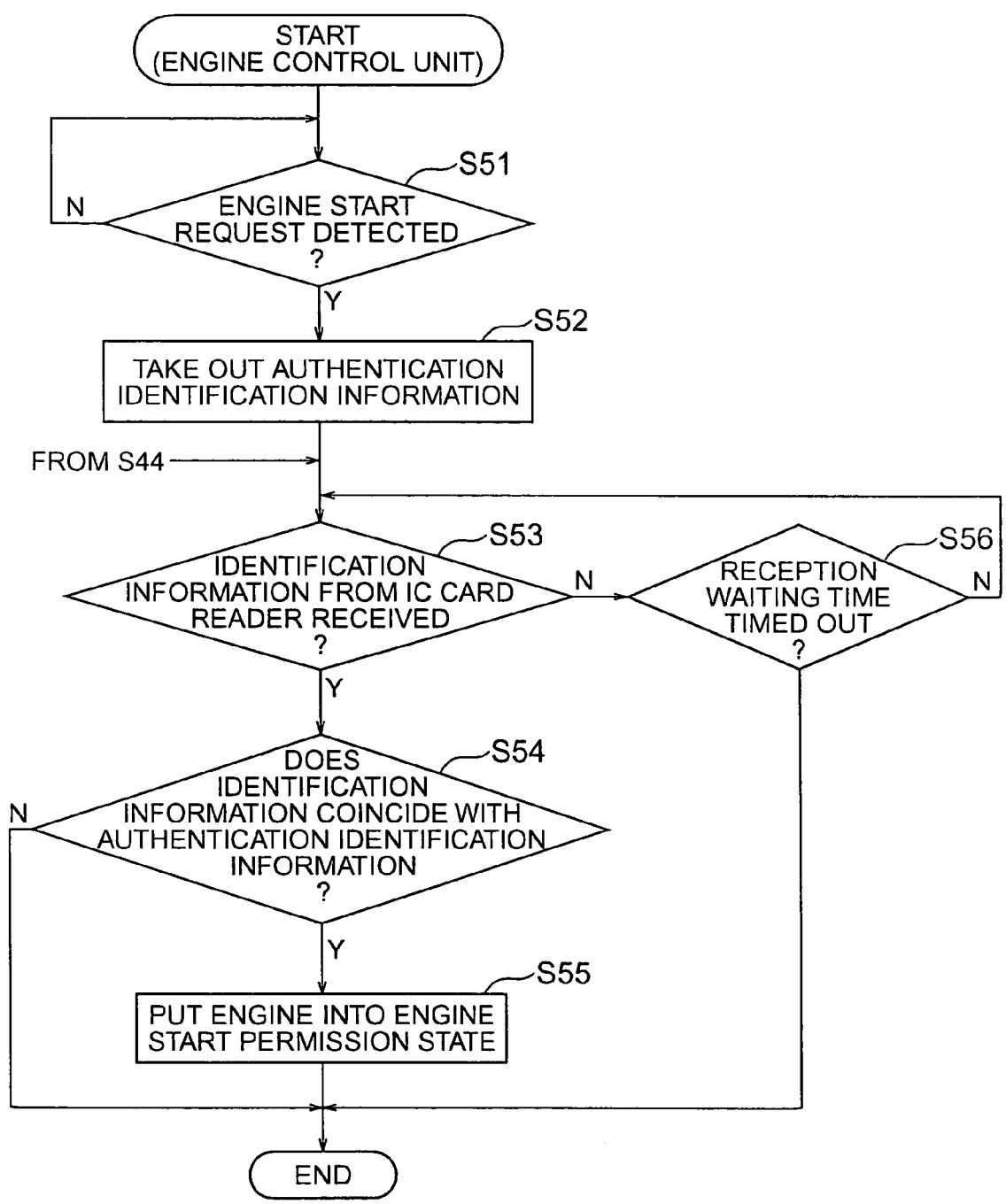
FIG. 5 is a flow chart illustrating the operation of an engine control unit of the vehicle anti-theft apparatus according to the first embodiment of the present invention.

When it is determined in step S54 that the identification information and the authentication identification information coincide with each other (that is, Yes), the engine 7 is put into an engine start permission state (step S55), and the processing of FIG. 5 is terminated, whereas when it is determined in step S54 that the identification information and the authentication identification information do not coincide with each other (that is, No), the processing of FIG. 5 is terminated at once.

In addition, when it is determined in step S53 that identification information has not been received from the IC card reader 3 (that is, No), it is determined whether a reception waiting time has timed out (step S56).

Here, for example, an arbitrary predetermined time after an engine start request is detected in step S51 is set as the reception waiting time.

When it is determined in step S56 that the reception waiting time has timed out (that is, Yes), the processing of FIG. 5 is terminated at once, whereas when it is determined in step S56 that the reception waiting time has not timed out (that is, No), a return is carried out to step S53 where it is determined again whether identification information has been received from the IC card reader 3.

Here, note that once the engine 7 becomes a start permission state, it holds the start permission state until a power supply for the engine control unit 6 is turned off, so the engine 7 never stops during the time when the vehicle 1 is traveling.

According to the vehicle anti-theft apparatus and method of the first embodiment of the present invention, the use time limit information determination section of the IC card reader 3 and the identification information determination section of the engine control unit 6 together constitute the authentication processing section that serves to authenticate a user when the user uses the vehicle 1.

In addition, the use time limit information determination section determines whether the current time is within the use time limit of the use time limit information, and when it is within the use time limit, the use time limit information determination section sends the identification information to the engine control unit 6. Also, the identification information determination section determines whether identification information received from the IC card reader 3 coincides with the authentication identification information, and puts the engine 7 into the engine start permission state when there is coincidence therebetween.

Accordingly, the theft of the vehicle 1 can be prevented with a simple system configuration without increasing the cost, and the illegal use of the theft vehicle 1 can also be prevented.

Moreover, the use time limit information determination section and the identification information determination section are formed in the interiors of the IC card reader 3 and the engine control unit 6, respectively, which are difficult to illegally remodel. Thus, the theft of the vehicle 1 can be further prevented.

Further, the identification information and the use time limit information stored in the memory 4 of the IC card 2 are read by the special IC card reader 3, and the identification information sent from the IC card reader 3 to the engine control unit 6 is transmitted as the encrypted serial communication signal, so security of the information can be improved.

In addition, the authentication processing section authenticates the user when the user tries to start the engine 7.

Thus, even when the use time limit for use or rental period expires during the vehicle 1 is traveling, the engine 7 is not stopped suddenly, thereby making it possible to ensure proper steering.

Further, the identification information and the use time limit information of the vehicle 1 is stored beforehand in the IC card by the rental car provider by using the special or dedicated IC card writing device 19 before the user carries the IC card 2. In addition, the identification information and the use time limit information stored in the memory 4 are encrypted.

As a result, there is no fear that the identification information and the use time limit information might be falsified by a third party, so security can be improved.

Although in the above-mentioned first embodiment, the use time limit information determination section is provided in the IC card reader 3 and the identification information determination section is provided in the engine control unit 6, the present invention is not limited to this, but the identification information determination section may be formed in the IC card reader 3, and the use time limit information determination section may be formed in the engine control unit 6.

In this case, the identification information determination section formed in the IC card reader 3 determines whether identification information and authentication identification information coincide with each other, and when there is coincidence therebetween, the use time limit information is sent to the engine control unit 6. Also, the use time limit information determination section formed in the engine control unit 6 determines whether the current time is within the use time limit of the use time limit information received from the IC card reader 3, and puts the engine 7 into the engine start permission state when the current time is within the use time limit.

Here, the current time may be sent from the IC card reader 3 to the engine control unit 6, or may be obtained from a timer device installed in the engine control unit 6.

In this case, too, the operational or advantageous effects similar to those of the above-mentioned first embodiment can be achieved.

Moreover, the identification information determination section and the use time limit information determination section need not be separately provided in the IC card reader 3 and the engine control unit 6, respectively, but the identification information determination section and the use time limit information determination section may instead be provided in either one of the IC card reader 3 and the engine control unit 6.

In case where the identification information determination section and the use time limit information determination section are provided in the IC card reader 3, when identification information and authentication identification information coincide with each other, and when the current time is within the use time limit, a serial communication signal that puts the engine 7 into the engine start permission state is sent from the IC card reader 3 to the engine control unit 6.

Also, in case where the identification information determination section and the use time limit information determination section are provided in the engine control unit 6, the serial communication signal containing identification information and authentication identification information is sent from the IC card reader 3 to the engine control unit 6.

In these cases, too, the operational or advantageous effects similar to those of the above-mentioned first embodiment can be achieved.

Further, although in the above-mentioned first embodiment, the current time is output from the timer device 14 in the IC card reader 3, the present invention is not limited to this, but the current time output from the GPS receiver 10 may instead be used.

Also, the standard wave having time information (current time) may be received and used as the current time.

In these cases, the current time is never modified or falsified by a third party, and hence security can be further improved.

Furthermore, although in the above-mentioned first embodiment, the vehicle 1 has been described as a rental car, the use time limit of the use time limit information may be set to a long term, so that the invention can be applied to vehicles in general.

In this case, too, the operational or advantageous effects similar to those of the above-mentioned first embodiment can be achieved.

While the invention has been described in terms of a preferred embodiment, those skilled in the art will recognize that the invention can be practiced with modifications within the spirit and scope of the appended claims.

What is claimed is:

1. A vehicle anti-theft apparatus comprising:
   an IC card that is carried by a user of a vehicle;
   an IC card reader that is provided in the vehicle for reading information in the IC card; and
   an authentication processing section that is provided in the vehicle for authenticating the user when the vehicle is used by the user;
   wherein the IC card includes a storage section that stores identification information of the vehicle and use time limit information of the vehicle;
   the identification information and the use time limit information are rewritten arbitrarily by an IC card writing device;
   the IC card reader includes a reading section that reads the identification information and the use time limit information stored in the storage section;
   the authentication processing section includes an identification information determination section that determines whether the identification information and authentication identification information that is stored beforehand in the vehicle coincide with each other, and a use time limit information determination section that determines whether a current time is within a use time limit of the use time limit information; and
   in the case that an engine start request is detected, the authentication processing section obtains the current time, and permits the use of the vehicle when the identification information determination section determines that the identification information and authentication identification information coincide with each other, and when the use time limit information determination section determines that the current time is within a use time limit of the use time limit information.

2. The vehicle anti-theft apparatus as set forth in claim 1, wherein the authentication processing section permits the starting of an engine of the vehicle.

3. The vehicle anti-theft apparatus as set forth in claim 1, wherein
   the current time is output from a timer device built into the vehicle.

4. The vehicle anti-theft apparatus as set forth in claim 1, wherein
   the current time is output from a GPS device installed on the vehicle.

5. A vehicle anti-theft method comprising the steps of:
storing, into an IC card that is carried by a user of a vehicle, identification information of the vehicle and use time limit information of the vehicle;
arbitrarily rewriting the identification information and the use time limit information by an ID card writing device;
reading the identification information and the use time limit information stored in the IC card by means of an IC card reader installed on the vehicle; and
determining whether the identification information and authentication identification information that is stored beforehand in the vehicle coincide with each other; and determining whether a current time is within a use time limit of the use time limit information;
permitting the starting of an engine of the vehicle by means of authentication processing section provided on the vehicle when the identification information and authentication identification information that is stored beforehand in the vehicle coincide with each other, and when a current time is within a use time limit of the use time limit information.

* * * * *